United States Patent [19]

Gruczelak

[11] 4,131,921
[45] Dec. 26, 1978

[54] HEAD POSITIONING SYSTEM FOR DISC FILES

[75] Inventor: Norman P. Gruczelak, Santa Barbara, Calif.

[73] Assignee: Okidata Corporation, Moorestown, N.J.

[21] Appl. No.: 787,885

[22] Filed: Apr. 15, 1977

[51] Int. Cl.$^2$ ............................................. G11B 21/00
[52] U.S. Cl. .................................. 360/86; 274/23 R; 360/137
[58] Field of Search ............. 360/86, 106, 107, 97–99, 360/78, 77, 103, 137; 274/23 R, 9 RA; 335/272, 273; 346/140 X; 179/100.4 D, 100.3 V

[56] References Cited

U.S. PATENT DOCUMENTS

| | | | |
|---|---|---|---|
| 2,660,510 | 11/1953 | Grass | 346/140 X |
| 3,378,799 | 4/1968 | Ovellette | 335/272 |
| 3,435,394 | 3/1969 | Egger | 335/272 |
| 3,471,655 | 10/1969 | Herve | 179/100.4 D |
| 3,530,447 | 9/1970 | Lambert | 360/78 |
| 3,614,333 | 10/1971 | Iwata | 360/106 X |
| 3,637,928 | 1/1972 | Poulett | 360/106 X |
| 3,740,735 | 6/1973 | Gabor | 360/97 |
| 3,825,951 | 7/1974 | Katsumori et al. | 360/98 |
| 3,975,769 | 8/1976 | King | 360/98 |
| 4,004,081 | 1/1977 | Zorn | 179/100.3 V X |

OTHER PUBLICATIONS

IBM Journal of Research & Development, Jul. 1976, pp. 389–397.

Primary Examiner—John H. Wolff
Attorney, Agent, or Firm—Fraser and Bogucki

[57] ABSTRACT

A positioner for precisely and quickly locating a magnetic head structure relative to a selected track on a disc file utilizes an electromagnetic device such as a brushless DC motor for pivoting a directly coupled arm and head mount through a small arc about a pivot axis. The motor, which may advantageously be mounted outside an hermetic enclosure for the discs and the arm and head structure of the positioner, comprises a multi-pole magnetic rotor whose mass is concentrated at the pivot axis, and whose periphery is closely encompassed by a stator. Energizing coils on the stator are wound in close magnetic coupling to the rotor to provide substantially uniform field distribution throughout the limited arc of movement of the rotor. While the masses of the rotor and an arm-coupling shaft are a substantial majority of the total mass of the positioner, the inertial components of the motor, shaft, and the positioner arm are well below the inertial components contributed by the head mount and heads at the terminus of the arm. Minute angular control at the motor pivot axis is feasibly translated into precise high speed accessing and tracking of selected locations on the discs. In addition, heat generated during high duty cycle energization of the motor is readily dissipated, and the motor is readily accessible for service and replacement without opening the dust-free hermetic enclosure.

5 Claims, 6 Drawing Figures

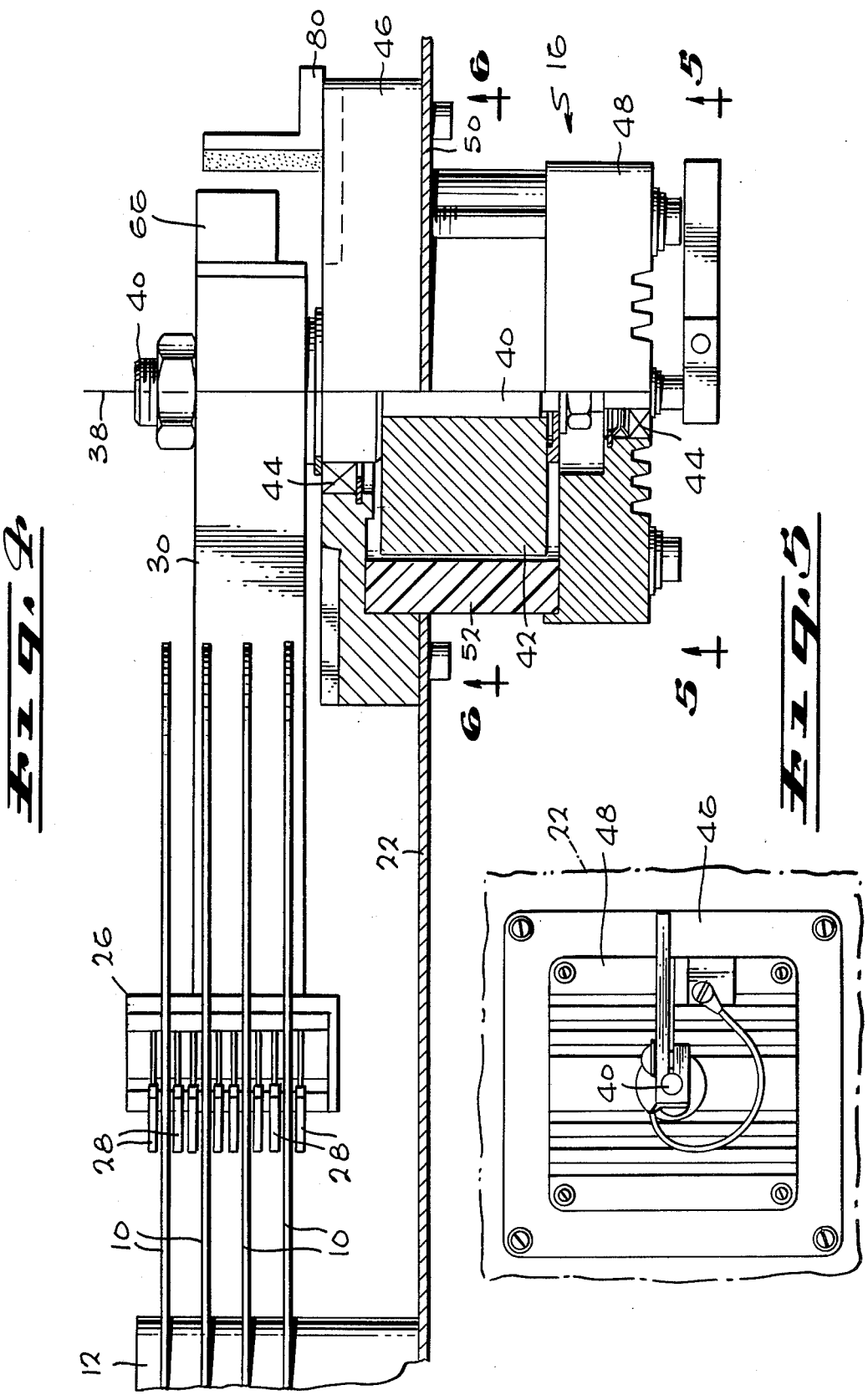

HEAD POSITIONING SYSTEM FOR DISC FILES

BACKGROUND OF THE INVENTION

1. Field of the Invention

This invention relates to positioners or actuators for controlling the accessing and tracking of magnetic heads in rotating magnetic memory systems, and particularly to high performance moving head actuators using a pivotal arm movement.

2. History of the Prior Art

In the relatively short history of magnetic disc file recording, the great majority of earlier positioners for selecting individual tracks for signal recording and reproduction have used radially movable mechanisms. Examples of this type of positioner are provided by U.S. Pat. Nos. 3,614,333, 3,637,928, 3,643,036 and 4,005,493. Although mechanical and hydraulic devices have sometimes been used as shown by these patents, most radial positioners now employ what are known as voice coil drives for translation of electrical signals into linear motion and precise positioning. Energization of a relatively large cylindrical coil coupled to the arm and head structure causes movement of a magnetically biased armature to a chosen track position. Constant improvements in recording technology and demand for increased storage capacity have imposed often conflicting requirements on positioner designs. A high force or torque relative to inertia must be generated in order to keep the motion time interval between track locations low. With track densities of 300 tracks per inch and sometimes substantially more, mechanical deflection can be a significant problem and structures must be devised that have proper rigidity. With high track densities and disc speeds, high servo bandwidths are required.

To meet these and other requirements, voice coil actuator types of systems have generally utilized a large voice coil, and have provided roller bearing mounts for the carriage. Because of the linear movement of the structure, its entire mass contributes to the inertia that is to be overcome, and the mass cannot be substantially reduced. Furthermore, bearing wear introduces inevitable variations in performance under the continuous, high speed operation to which these units are subjected.

There has been another trend in disc file configurations, arising also from the need for increased storage capacity. In this relatively newer trend, the discs are incorporated as fixed media within an hermetic enclosure, and the air within the enclosure is constantly filtered. Thus when the enclosure is assembled and closed and the system is thereafter operated, dust and other impurities are much less apt to affect performance. Contaminants become very significant at high recording densities and track densities, because the heads must be flown at a very close spacing from the surface of the disc.

Consideration of these problems had led to the introduction of a fixed media fully enclosed type of system in which what is termed a swinging arm mechanism is used as the head positioner. Such a system is described in an article entitled "Design Of A Swinging Arm Actuator For A Disc File," by J. S. Heath, pp. 389-397 of the IBM Journal of Research and Development for July 1976. The referenced article describes how a pivotal movement of the arm and the geometry of the head structure can be utilized for a high performance system, despite the changes in circumferential position of the head with different track locations. In the system described by Heath, the positioner arm is pivoted through a selected angle about a pivot axis which is intermediate the length of the arm. With the head mount and heads being coupled to one terminus of the arm, a voice coil structure is coupled to the arm on the opposite side of the pivot axis. The coil armature is interior to the coil, which has a rectangular cross-section and which does not provide a uniform magnetic interaction throughout the arc of pivotal movement. Furthermore, with the rectangular section of coil, there is a rather ineffective coupling between the magnetic field of the coil and the interior armature. Moreover, this entire structure is mounted within the enclosure and is therefore not easily accessible for service or replacement of the operative components. Because the mass of the coil and the supporting arm are at a radial distance from the pivot axis, the inertia of the entire structure is substantial, and therefore greater power is required for low motion intervals as the system is operated. All heat generated during energization of the actuator must be dissipated within the enclosure, which is an undesirable feature. The system is a successful one, but it would be highly desirable to eliminate or minimize some of the mentioned problems, and to substantially decrease the average access time by providing a more efficient system.

SUMMARY OF THE INVENTION

Positioners in accordance with the invention employ an electromagnetic drive structure disposed at the pivot axis in a swinging arm type of positioner mechanism. A relatively high mass rotor structure concentric with the pivot axis and coupled to the swinging arm is disposed in close coupling relation with an encompassing coil and core structure, and pivots with high speed and accuracy between chosen positions within a limited arc of movement. Magnetic heads disposed in operative relation with one or more magnetic discs, and coupled to head mounts at the terminus of the arm, are thereby moved accurately and rapidly to successive track addresses.

A feature of positioners in accordance with the invention is the disposition of the central energizing mass at the pivot axis, where its contribution to system inertia is low, in conjunction with the disposition of successively lower masses at further radii from the pivot axis. Consequently, a substantial weight of magnetic material can be employed, and with a concentric core and coil structure, an extremely close coupling between the rotor and the magnetic field can be achieved.

Another feature in accordance with the invention resides in the disposition of the motor outside of the enclosure for the magnetic storage media, where the motor is readily available for servicing and the heat generated can be externally dissipated. With a centrally disposed magnetic rotor relative to the pivot axis, and a light weight arm, the majority of the power is utilized essentially to drive the head system.

BRIEF DESCRIPTION OF THE DRAWINGS

The foregoing and other objects, features and advantages of the invention will be apparent from the following more particular description of a preferred embodiment of the invention, as illustrated in the accompanying drawings, in which:

FIG. 4 is a side view, partly in section, of a portion of the magnetic disc system of FIG. 1 showing the disposition of the magnetic transducers relative to the magnetic discs and the details of the motor of the positioning system of FIG. 1;

FIG. 5 is a bottom view of the motor of the positioning system of FIG. 1 as seen from the line 5—5 of FIG. 4.

DETAILED DESCRIPTION

Figure 1:
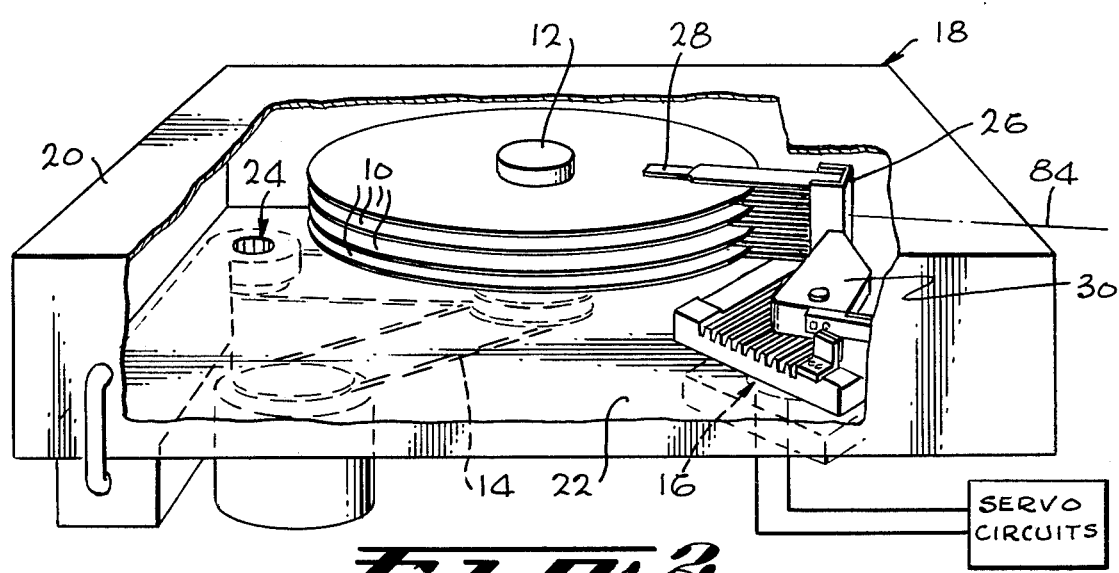
FIG. 1 is a perspective view, partly broken away, of a magnetic disc system employing a positioning system in accordance with the invention.
Figure 2:
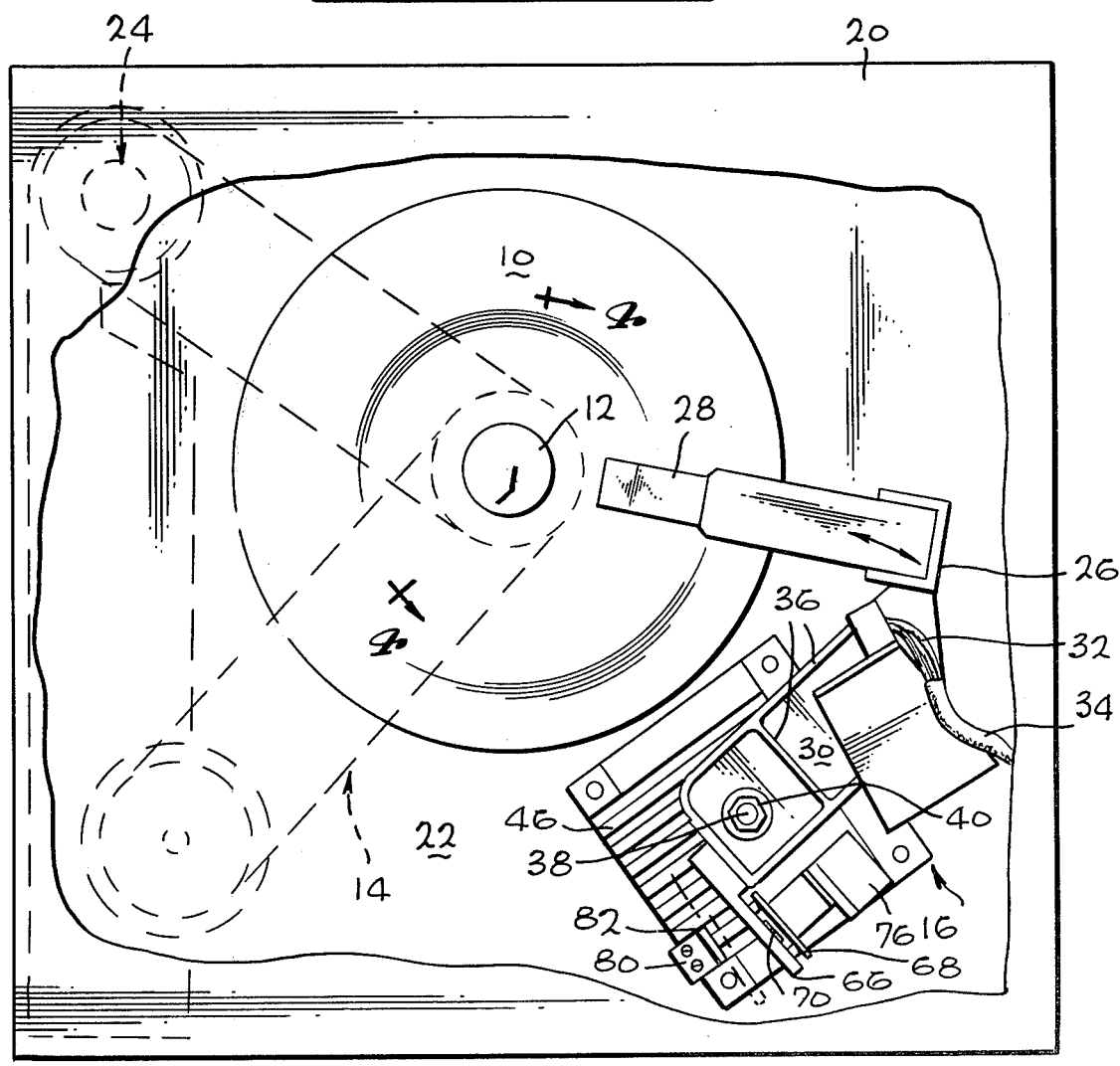
FIG. 2 is a top view, partly broken away, of the magnetic disc system of FIG. 1.

Systems in accordance with the invention, referring now to FIG. 1, are advantageously used in the fixed media type of disc memory system. One or a number of discs 10 are mounted on a fixed spindle 12 in non-interchangeable fashion, the spindle 12 being driven by a belt and pulley system 14 from a drive motor 16. An enclosure 18 about the spindle 12 and disc or discs 10 generally includes a cover 20 and a base plate 22 on which the various operative elements may be mounted. An air circulation system 24 including a blower and a filter is in communication with the interior of the enclosure 18, which is hermetically sealed. In this system, given by way of example, the discs 10 are rotated at 50 revolutions per second, and a track density of 286 tracks per inch and a bit density of 5636 bits per inch are employed to give a 12.40 megabyte capacity for each recording surface. In addition, fixed heads can be utilized to provide an additional data storage capacity, although these are not shown for simplicity and brevity. Typically, the underside of a single disc or the lowest disc in a number of discs is utilized for positioner servo information.

The positioner mechanism is shown in FIGS. 1-6, and includes a head mount 26 including inner and outer head pads 28, of conventional configuration, mounted on the terminus of a light weight swinging arm 30. The head assemblies, including the head support plate, magnetic heads and the head flying structure, may be conventional and therefore will not be described in further detail. Head signal cables 32 couple to a fixed wiring harness 34 which leads to external data signal recording and reproduction circuits (not shown in detail).

The swinging arm 30 itself is a structural member, typically of cast magnesium or aluminum, configured with peripheral and transverse ribs 36 to resist bending moments in the vertical direction and torsional moments in the horizontal plane in which the structure is typically mounted about a vertical pivot axis 38. At the pivot axis 38, the swinging arm 30 is coupled to a motor shaft 40 which is coaxial with a four pole magnetic rotor 42 concentric with the pivot axis 38. At each of the upper and lower ends of the shaft 40, the shaft 40 is journaled in bearings 44 within upper and lower end bells 46 and 48 respectively. The upper end bell 46 is a large metal mass, preferably aluminum or some other light weight metal, and is secured to a base plate 50 forming the base plate 22 of the enclosure 18. The underside of the lower end bell 48 also is finned, to provide a heat dissipating structure, and similarly may be of aluminum or other light weight metal. The end bells 46 and 48 can be configured to dissipate different amounts of heat energy inside or outside the enclosure by changing their relative sizes.

Figure 6:
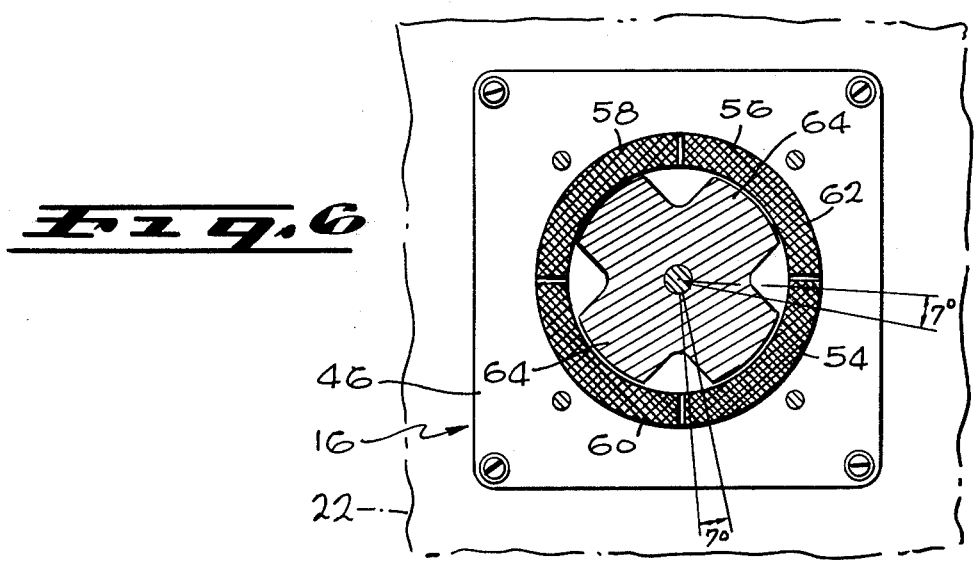
FIG. 6 is a sectional view of the motor of the positioning system of FIG. 1 taken from the line 6—6 of FIG. 4.

The rotor 42 of the motor 16 is relatively small (2.5 inches diameter) and is mounted on the shaft 40 at the underside of the upper end bell 46 but isolated from the interior of the enclosure 18. The motor 16 comprises also an encompassing fixed toroidal core 52 about the outer periphery of the rotor 42, and having a spacing of approximately 0.0525 inch in this example. With a four pole rotor 42, four coil segments 54, 56, 58 and 60 of a coil 62 are wound about different quadrant positions of the core 52, the thickness of the coil wire providing a gap of approximately 0.020 inch between the periphery of the rotor 42 and the inner surface of the coil 62. In the present example, it is desired to pivot the rotor 42 and associated structure through an arc of approximately 7°, and to provide a linear field with respect to the rotor poles 64, whatever the position of the rotor 42. Each of the coil segments 54, 56, 58 and 60 is extended through an arc of approximately 90°, to provide an overlap region that extends beyond the extreme position of each edge of the rotor poles 64 at each extreme position of the rotor 42, as best seen in FIG. 6.

Figure 3:
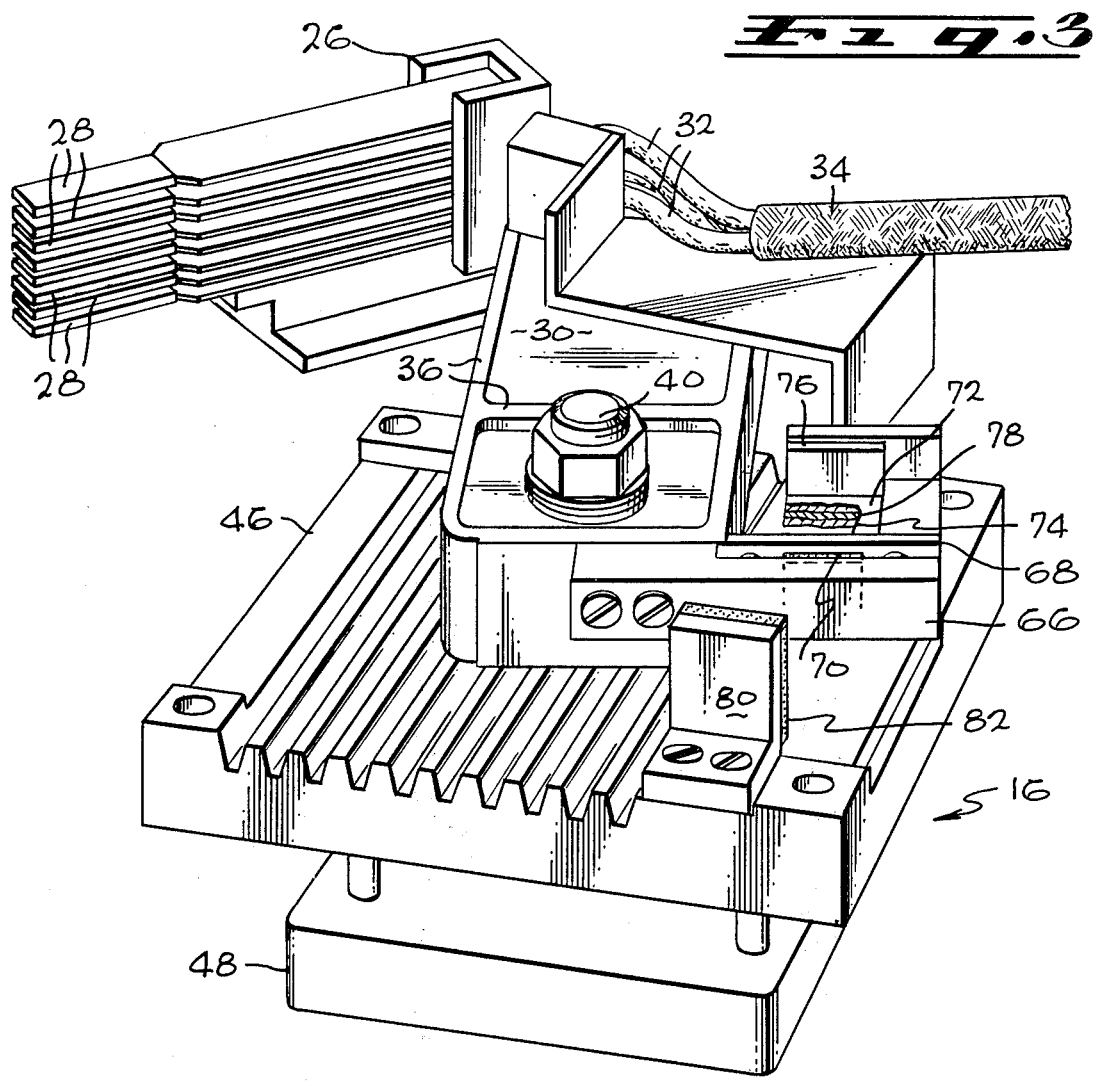
FIG. 3 is a perspective view of the positioning system of FIG. 1.

A bracket 66 is mounted on the arm 30, adjacent the pivot axis 38, and extends outwardly to provide a limit stop mechanism and a single position detent. The bracket 66 includes an iron armature 68 separated from the bracket by a rubber shock absorber 70. As shown in FIG. 3, the armature 68 bridges the edges of a pair of pole pieces 72 and 74 when the arm 30 is in one extreme of rotation defining a detent position. The pole pieces 72 and 74 which are mounted on a mounting bracket 76 secured to the upper end bell 46 sandwich a magnet 78 therebetween. This permanent magnet structure provides a magnetic field concentrated in the vertical plane between the pole pieces 72 and 74, so that throughout the normal arc of movement of the arm 30 there is little attractive force exerted between the magnetic field from the permanent magnet 78 and the armature 68. When the arm 30 is to be moved to the landing position for the heads 28, however, the pole pieces 72 and 74 opposing the armature 68 provide a strong retaining force at this limit position, thus constituting a fixed detent. On the opposite side of the bracket 66 from the permanent magnet structure in another selectably adjustable position, a second limit stop 80 having a resilient facing element 82 is disposed to engage the bracket 66 when the arm 30 reaches its opposite limit of rotation.

The drive signals for energizing the head positioning motor 16 may be derived from a conventional servo, such as is described in the article entitled "Design Of A Disc File Head-Positioning Servo" by R. K. Oswald, pp. 506–512 of the IBM Journal of Research and Development for November 1974. In general, both the track accessing functions and the track following functions may be accomplished by a wide variety of techniques. However, for purposes of the present example the use of servo tracks of the character described in the article, accompanied by comparable circuits or providing driving signals for moving from one position to another, and servo signals for track following, can be assumed.

The rotor 42 and the remainder of the system are configured to provide a desirable balance between drive torque, inertia, and structural rigidity. In this rotary system, the inertia (J) which must be accelerated by the rotor is proportional to mass (M) and the square of the radius (R) at which the mass is located. Thus:

$$J = MR^2 \tag{1}$$

Angular acceleration ($\ddot{\theta}$) is proportional to the torque ($\lambda$) applied by the rotor and inversely proportional to inertia driven. Thus:

$$\lambda = J\ddot{\theta} \tag{2}$$

Power is the integral of torque applied through the angle as the heads are moved from one point to another. Thus the more rapidly the heads are moved, or the higher the inertia, the larger the torque that is required. Thus:

$$P = \int_{\text{point a}}^{\text{point b}} \lambda \theta \tag{3}$$

At any time during the move torque will be applied to accelerate and decelerate. In a DC motor, torque is proportional to current (I). Thus:

$$\lambda = I K_t \tag{4}$$

where $K_t$ = torque constant. The motor has a resistance (r) and, therefore, power loss due to resistance (Pr) is proportional to $I^2$ and r. Thus:

$$Pr = I^2 r \tag{5}$$

Therefore, for a given acceleration:
From equation (4), Pr is proportional to $\lambda^2$
From equation (2), Pr is proportional to $J^2$
From equation (1), Pr is proportional to $R^4$
Power dissipation will increase with this fourth power of the radius at which the mass is located.

In the present system, although the motor 16 is compact, a relatively high volume and high mass of magnetic material is employed. The length and cross-sectional area of the rotor 42 that is seen by the energizing coil segments 54, 56, 58 and 60, and the degree to which the rotor material can be magnetized, are relatively high. For a four pole rotor in this example a mass of 785 grams is used. The mass of the arm 30 is 197 grams, and the mass of the heads 28 and head mounts 26 is 111 grams in this example. However, the inertial components of the system contributed by these different portions is just the opposite, in that the rotor 42, including the shaft 40, has an inertia of only 0.04 inch oz. sec.$^2$, whereas the inertia of the arm 30 is only 0.05 inch oz. sec.$^2$ and the inertia due to the heads 28 and mounts 26 is 0.25 inch oz. sec.$^2$. From the prior discussion, and from equations (4) and (5) above, it can be seen that the power loss is proportional to $1/K_t^2$. Because the power dissipation increases with the fourth power of the radius at which the mass is located, the rotor weight contribution to inertia is a significant factor in achieving a usable torque constant ($K_t$) in the motor 16. Although the rotor 42 weighs more than twice the combined weight of the heads 28 and arms 30 it contributes only 12% of the total inertia. Although the arm 30 may be almost twice the weight of the heads 28 and mounts 26, and therefore structurally rigid, it only contributes 15% of the total inertia. Consequently, systems in accordance with the invention are able to achieve a full travel distance of 1¼ inches in less than 40 milliseconds. As seen in FIG. 1 the head mount 26 and the included head pads have a center of gravity 84 which is located at the terminus of the arm 30. Such arrangment tends to prevent overturning moments on the arm and eventual resonance in response to forces. At the same time, however, the motor 16 can be advantageously located outside of the enclosure 18 with the upper end bell 46 forming an airtight cell. In prior art structures using a voice coil type drive the voice coil actuator must typically be disposed on the same axis as the center of gravity of the head mount or at least in the same plane therewith, and if used in a fixed media hermetically sealed system the voice coil would have to be enclosed within the sealed disc enclosure to avoid sealing problems.

Further, the motor 16 mounted between large end bells 46 and 48 exterior to the disc enclosure 18 provides a large outer surface for exterior dissipation of heat. Inasmuch as a relatively short, stiff motor shaft 40 is disposed at each end within ball bearings, the entire structure is extremely stable, and this further permits minute positioning of the rotor 42 within the arc of movement to be reflected as substantially greater movement at the operative position of the heads 28. Further, structural rigidity is enhanced by the fact that the total weight of the positioner system is under 5 pounds. This makes it possible to achieve a natural frequency greater than 1 KHz between the positioner and the spindle using a light weight and compact coupling means. Thus, a light weight but stiff, fast acting system is provided, and the natural frequency of the arm 30 is kept above 1 KHz, whereas a bandwidth of greater than 300 Hz is achieved in the servo system.

It will be appreciated by those skilled in the art that other forms of motors than that shown and described herein can be used in accordance with the invention. For example a printed circuit motor in which the permanent magnet forms the stator and the rotor carries the coils etched in fiberglass can be used.

While the invention has been particularly shown and described with reference to a preferred embodiment thereof, it will be understood by those skilled in the art that various changes in form and details may be made therein without departing from the spirit and scope of the invention.

What is claimed is:
1. A positioner mechanism for disc file systems comprising:
   an arm of relatively small mass extending to a free end from a pivot axis at the opposite end of the arm;
   a head mount of relatively small mass and including at least one head pad, the head mount being coupled to the free end of the arm; and
   rotatable means coupled to said opposite end of the arm concentric with the pivot axis for driving the arm, the means for driving the arm including a magnetic rotor concentric with and rotatable about the pivot axis, the rotor having a mass substantially greater than the mass of the arm and the mass of the head mount, a magnetic core surrounding and concentric with said rotor, and means coupled to said core for energizing the core and including a coil about said core and proximate said rotor, said rotor comprising a plurality of poles, said coil comprising multiple coil segments, each of which is disposed in facing relation to a different rotor pole, each of said coil segments defining an arc having a length substantially encompassing the combined lengths of the arcs of rotational movement of the facing rotor pole in opposite directions and the arc defined by the length of the pole, said rotor rotat- ing through an angle less than ± 15° and the air gap between the end of each of the rotor poles and the core being less than 0.1 inches.

2. The invention as set forth in claim 1, above, wherein said rotor comprises a four pole rotor and said core comprises a toroidal core having four coil segments, each of which extends along a substantial part of a different quadrant of the toroidal core.

3. The invention as set forth in claim 2 above, including in addition means coupled to said arm for maintaining said arm at a limit position.

4. The invention as set forth in claim 1 above, wherein said means for driving the arm comprises a pair of end bells, each of which is in thermal interchange relation with said core and on opposite sides of said rotor along the pivot axis.

5. The invention as set forth in claim 4 above, wherein said end bells are capable of storing and dissipating heat, wherein said rotor includes a shaft extending along the pivot axis within each of said end bells, and wherein in addition a rotatable bearing couples each of said end bells to the shaft.

* * * * *